United States Patent [19]
Takeda et al.

[11] Patent Number: 5,152,947
[45] Date of Patent: Oct. 6, 1992

[54] PROCESS FOR PRODUCING CELLULOSE TRIACETATE FILM

[75] Inventors: Ryo Takeda, Kanagawa; Hisashi Shiraishi, Shizuoka, both of Japan

[73] Assignee: Fuji Photo Film Co., Ltd., Kanagawa, Japan

[21] Appl. No.: 686,384

[22] Filed: Apr. 17, 1991

[30] Foreign Application Priority Data

Apr. 19, 1990 [JP] Japan .................. 2-103707

[51] Int. Cl.⁵ .................................. B29D 7/01
[52] U.S. Cl. ............................ 264/217; 264/207
[58] Field of Search ............... 264/217, 207, 200

[56] References Cited

U.S. PATENT DOCUMENTS

| 3,855,133 | 12/1974 | Roehsler | 264/41 |
| 4,592,885 | 6/1986 | Ichino et al. | 264/207 |
| 4,643,856 | 2/1987 | Nichols | 264/217 |

FOREIGN PATENT DOCUMENTS

| 229074 | 10/1985 | Fed. Rep. of Germany | 264/217 |
| 94724 | 5/1986 | Japan | 264/217 |
| 100421 | 5/1986 | Japan | 264/217 |
| 148013 | 7/1986 | Japan | 264/217 |
| 158413 | 7/1986 | Japan | 264/217 |
| 2013559 | 8/1979 | United Kingdom | 264/217 |

Primary Examiner—James Lowe
Attorney, Agent, or Firm—Sughrue, Mion, Zinn, Macpeak & Seas

[57] ABSTRACT

A cellulose triacetate film excellent in both of the tear strength and the folding endurance can be obtained by casting a cellulose triacetate dope using a solvent mixture of methylene chloride with the other solvent in a ratio of 13 to 25 wt. % of the total solvent weight on a support of which the surface temperature is kept lower than 10° C., and drying with controlling the drying conditions so that the content of volatile components in the film and the film surface temperature enter a particular region or so that the content of volatile components in the film and the shrinkage percentage of the film in the cross direction enter in a particular region. The film thus obtained is also excellent in flatness.

1 Claim, 2 Drawing Sheets

PROCESS FOR PRODUCING CELLULOSE TRIACETATE FILM

BACKGROUND OF THE INVENTION

This invention relates to a process for producing a cellulose triacetate film by the solution casting process, and more particularly, relates to a process for producing a cellulose triacetate film increasing the film strength, particularly tear strength and folding endurance.

Cellulose triacetate (TAC) films are widely utilized as the film base for photographic films, and, in general, are produced in solution casting process. In the solution casting process, cellulose triacetate and plasticizer is dissolved in a solvent mixture of which the principal solvent is methylene chloride and some poor solvents of cellulose triacetate (hereinafter called poor solvent(s)) to obtain a dope, and the dope is fed uniformly from a die continuously on a rotating endless support. The solvents are evaporated on the support, and after the dope is solidified, it is stripped from the support. Then, it is dried to obtain the film.

Recently, a method capable of increasing the film producing speed was developed by adding a poor solvent, such as methanol and cyclohexane, ethanol and n-butanol or abundant methanol or ethanol in addition to methylene chloride into the cellulose acetate dope to accelerate the solidification speed (U.S. Pat. Nos. 2,607,704, 2,739,069, Japanese Patent KOKOKU No. 45-9074, Japanese Patent KOKAI No. 54-48862). However, this method is insufficient for shortening the time from the feeding to the stripping and the time after the stripping.

Another method for accelerating the film producing speed of TAC film is that the dope is fed on the endless support of which the surface temperature is kept lower than 10° C. to accelerate the solidification and is stripped off at an early stage (Japanese Patent KOKAI Nos. 62-37113, 62-64514 and 62-115035). According to this method, since the film stripped from the support can be dried from both sides efficiently, it is possible that the time necessary for producing the film is sharply shortened. However, when the film is dried under the conventional conditions, the obtained film is undesirable in its physical strength, particularly folding endurance.

Incidentally, a method for improving the film strength is known (Japanese Patent KOKOKU No. 61-39890). In this method, a dope containing a poor solvent in addition to methylene chloride is fed on the surface of a band support, and the dope layer is heated up to 30°–42° C. within 3 minutes after fed and kept at this temperature at least for 15 seconds to increase the film strength, particularly tear strength. However, the folding endurance of the film obtained in this method is still insufficient. Moreover, the time from feeding the dope on the band surface to stripping off is long, and therefore, a long time is necessary for the production of the film.

Another method for improving the film strength is that the film is dried with keeping the shrinkage percentage to 3–20% (described in Japanese Patent KOKOKU No. 49-5614 as the prior art), but the film producing speed cannot be increased sufficiently by this method.

Still another method is that the shrinkage percentage is increased up to more than 20% by adding a poor solvent abundantly or by drying with keeping the stripped film at a low temperature (Japanese Patent KOKOKU No. 49-4554). However, this method has disadvantages of insufficient film producing speed and the occurrence of wrinkle.

As mentioned above, only one of the physical strength and the producing speed is improved by the aforementioned methods, and a method capable of satisfying both of the physical strength and the producing speed has not developed yet.

SUMMARY OF THE INVENTION

An object of the invention is to provide a process for producing a cellulose triacetate film having a great physical strength, particularly tear strength and folding endurance together with shortening the time for the production of the film.

Another object of the invention is to provide a process for producing a cellulose triacetate film excellent in flatness.

The present invention provides a process for producing a cellulose triacetate film which has achieved the above objects which comprises a process for producing a cellulose triacetate film which comprises a flow casting process comprising feeding a dope having a concentration in the sum of cellulose triacetate and the other component(s) becoming solid after drying of 18 to 35 wt. % and the ratio of the solvent(s) other than methylene chloride in the solvent composition of 13 to 25 wt. % onto a support of which the surface temperature is kept lower than 10° C., and a drying process comprising stripping the cast film from the support and drying under the conditions satisfying the following inequalities:

$$60 \leq X, \ Y \leq 40$$

$$30 \leq X < 60, \ Y \leq -4X/3 + 120$$

$$X < 30, \ Y \leq -10X/3 + 180$$

X: The content (%) of volatile components in the film
Y: The surface temperature (°C.) of the film, and A process for producing a cellulose triacetate film which comprises a flow casting process comprising feeding a dope having a concentration in the sum of cellulose triacetate and the other component (s) becoming solid after drying of 18 to 35 wt. % and the ratio of the solvent(s) other than methylene chloride in the solvent composition of 13 to 25 wt. % onto a support of which the surface temperature is kept lower than 10° C., and a drying process comprising stripping the cast film from the support and drying under the conditions satisfying the following inequalities:

$$X \geq 40, -5 \leq Z \leq -X/2 + 40$$

$$X \leq 40, \ -X/4 + 5 \leq Z \leq 20$$

X: The content (%) of volatile components in the film
Z: The shrinkage percentage (%) of the film in the cross direction.

DETAILED DESCRIPTION OF THE INVENTION

The cellulose triacetate film is produced by feeding a dope of cellulose triacetate on a support, stripping off the film formed on the support, traveling the stripped film in a drying chamber with pulling both side edges toward the outside in the cross direction by a width keeping device while the film is dried by hot air or the like.

Figure 1:
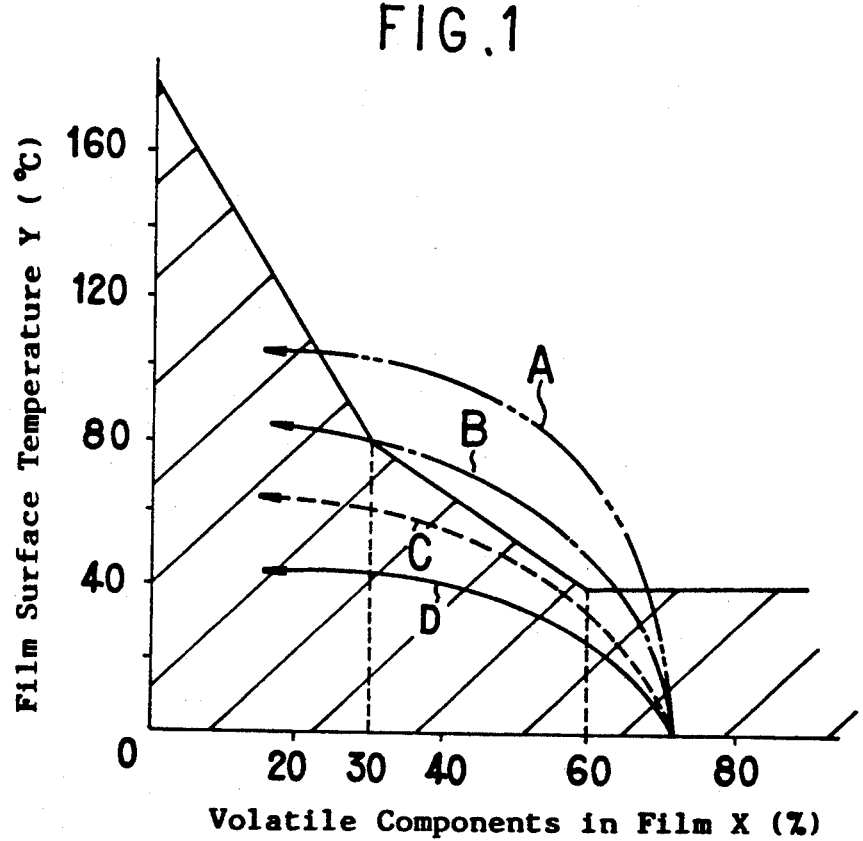
FIG. 1 is a graph indicating a relation between the volatile component X in a film and the surface temperature Y of the film.

In the process of the invention, the aforementioned objects are achieved by drying a film under the aforementioned conditions so that volatile components X (%) in the film and the surface temperature Y (°C.) of the film enter in a region determined by the aforementioned inequalities, i.e. the oblique lined part in FIG. 1. When the cellulose triacetate film is dried out of the region, crystallization of cellulose triacetate is accelerated resulting to degrade the folding endurance, flexibility and the like which are important for the film strength.

The content of volatile components X (%) is represented by the following formula.

$$\text{Volatile components } X (\%) = \frac{\text{Weight of residual volatile component}}{\text{Weight of film}}$$

The weight of residual volatile components: A film at t °C. is heat-treated at 115° C. for 1 hour, and this weight is the remainder of the weight of the film before the heat treament from which the weight of the film after the heat treatment was substracted. That is, the weight evaporated during the heat treatment is considered as the residual volatile component in the film at t °C.

The surface temperature Y (°C.) of the film may be measured by various measuring devices, such as an infrared surface thermometer or a contact-type surface thermometer.

The drying means for drying the film is not limited, and various conventional means, such as disclosed in Japanese Patent KOKAI No. 62-115035. For example, hot air or infrared rays are used as the drying means. When hot air is used, after controlling the width of the film, the temperature of the hot air is immediately raised to higher than the boiling point. It is possible that the film is heated near 100 ° C. at once. The hot air is preferably blown on both sides of the film in order to accelerate the drying, and a preferred blowing angle is perpendicular to the film surface.

Figure 2:
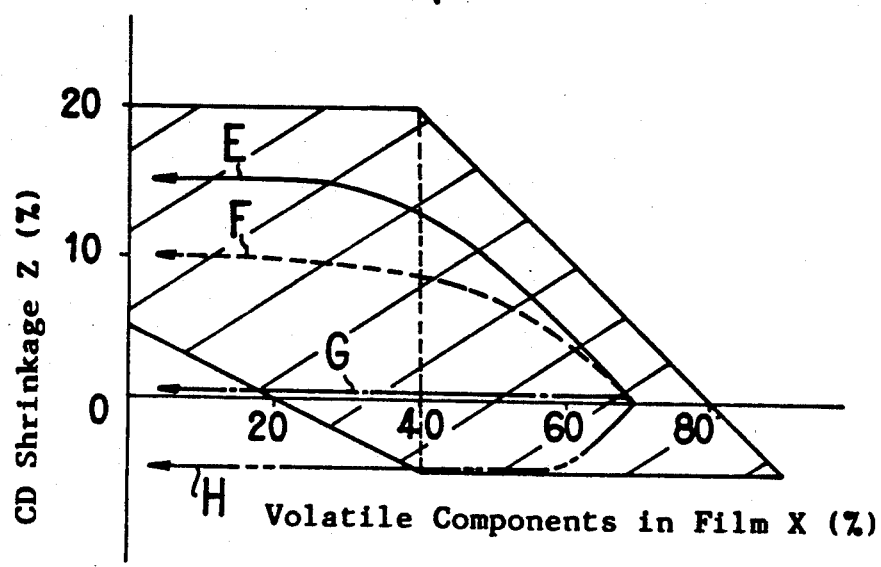
FIG. 2 is a graph indicating a relation between the volatile component X in a film and the shrinkage percentage Z of the film in the cross direction.

In order to obtain a cellulose triacetate film achieved the aforementioned object, another regulation for drying the film is possible so that volatile components X (%) in the film and the shrinkage percentate Z (%) in the cross direction of the film enter in a region determined by the aforementioned inequalities, i.e. the oblique lined part in FIG. 2. When the film is dried in the region under the oblique lined part, planar orientation is accelerated resulting to reduce tear strength and folding endurance. When the film is dried in the region over the oblique lined part, wrinkle occurs to degrade the flatness of the film. Therefore, the film cannot be used for photographic film.

The shrinkage percentage Z (%), in the cross direction of the film (CD shrinkage) is represented by the following formula.

$$\text{CD Shrinkage } Z (\%) = \frac{L_o - L}{L_o} \times 100$$

$L_o$: Film width after stripping
$L$: Film width of dried film .

In general, since the film is shrunk by drying, the control of the width of the film is conducted by keeping the film width constant immediately after stripping the film from the support or reducing the film width gradually. In the process of the invention, the film is dried with maintaining the volatile components X and CD shrinkage Z in a prescribed relation by controlling the film width. As the means for controlling the width, conventional width controllers can be used. Besides, it is possible that the casting machine may be directly joined to the width controller without providing a stripping roll. It is also possible that the width controller is provided apart from the support by some reasons such as a space problem. In this case, it is necessary to avoid rapid drying before controlling the width. As the means for grasping both side edges of the film is order to control them in the cross direction, for example, pin clips may be used. Clips for tenter may also be used which are used for drawing polyester film, etc.

Figure 3:
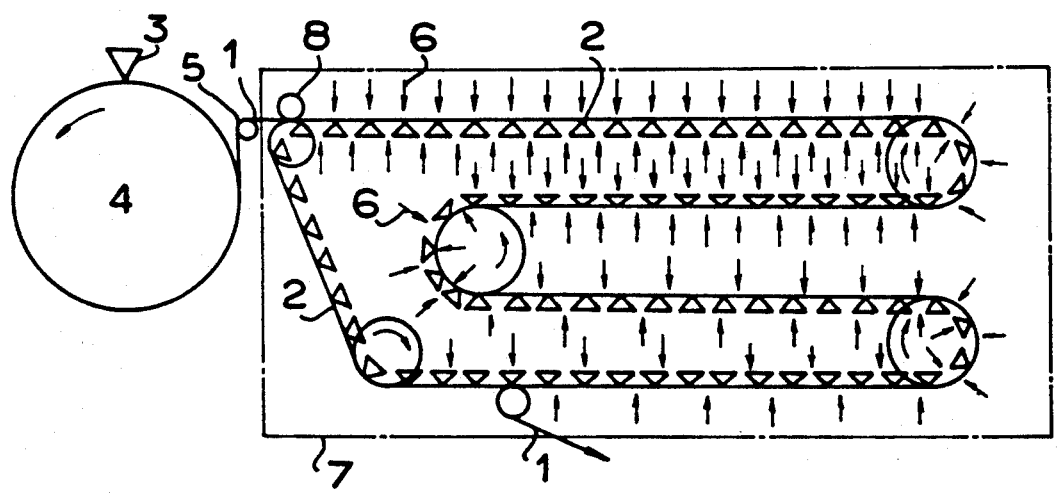
FIG. 3 is a schematic illustration of an apparatus for producing a cellulose triacetate film to which the process of the invention is applicable.

An apparatus for producing a cellulose triacetate film is schematically illustrated in FIG. 3. Cellulose triacetate dope is fed from the casting die 3 onto the support 4 of the cooling drum, and the film 1 is stripped from the drum at the stripping roll 5 portion. Then, both side edges of the film 1 are fixed by a width keeping device 2, and travels with meandering in a drying chamber 7 while the film is dried by hot air 6. When pin clips are used for the width controller 2, a grooved roll 8 may be used for thrusting the film into the pins. The both sides of the film fixed by the width controller are kept a prescribed interval through traveling. The interval is constant, or gradually narrower or wider during traveling. The range of narrowing or expanding is about ±20% of the interval in the beginning of the width control. Of course, the interval may vary in an arbitrary pattern according to the travel. In general, since the film is shrunk is drying, it is necessary that the interval is kept constant or gradually narrowed.

In the region over the oblique lined part in FIG. 2, the film is rapidly shrunk in the cross direction, and a suitable tension is not added to the film. Therefore, uneven shrinkage occurs in the film, and the flatness is degraded. While, in the region under the oblique lined part in FIG. 2, the film is greatly drawn in the cross direction, and the film strength is reduced.

The above process is characterized by controlling the CD shrinkage in a prescribed range corresponding to the content of volatile components in the film in the drying process to obtain a cellulose triacetate film having preferable properties, and therefore, to control the content of volatile components and the CD shrinkage in the range is preferred.

Cellulose triacetate is substituted with about three acetyl groups per cellulose unit, and usually, the degree of the substitution is indicated by the acetylated degree. As the cellulose triacetate used for the process of the invention, that having an acetylated degree of 56 to 62% is preferred. The raw cellulose for producing the cellulose triacetate may be any known one, such as pulp or linter.

As the other component(s) becoming solid after drying, plasticizer, stripping accelerator and the like are usable.

The plasticizer includes phosphate, esters such as triphenyl phosphate, tricresyl phosphate, triethyl phosphate and biphenyldiphenyl phosphate, phthalate esters, such as dimethyl phthalate, diethyl phthalate and dimethoxyethyl phthalate, glycolate esters, such as methylphthalylethyl glycolate and ethylphthalylethyl glycolate, and combinations of them. A blendable amount of the plasticizer is about 5 to 30 wt. % of the cellulose triacetate. Since excess plasticizer bleeds out from the film during drying, 5 to 20 wt. % is preferred.

The stripping accelerator is blended in order to shorter the time from feeding the dope to stripping the film from the endless support. As the stripping accelerator, various metal soaps are known, and preferred ones are disclosed in U.S. Pat. Nos. 2,275,716, 3,528,833, 3,793,043, 4,348,238 and Japanese Patent KOKAI No. 61-243837.

As the solvent other than methylene chloride, α-amides, polyols, such as diethylene glycol, aromatic compounds, such as monochlorobenzene, benzene and toluene, esters, such as ethyl acetate and propyl acetate, ethers, such as tetrahydrofuran, methyl cellosolve and ethylene glycol monomethyl ether. The solvent is used as a mixture and 13 to 25 wt. % of the total solvent weight is the solvent(s) other than methylene chloride. Methylene chloride is a good solvent for cellulose triacetate, and in order to strip off the film in a short time after feeding the dope on an endless support, it is necessary to keep the ratio by weight of methylene chloride in the above solvent composition range. It was found in the present invention that even though the ratio of methylene chloride which is a good solvent is reduced as mentioned above, a good film wherein tear strength and folding endurance are balanced can be obtained. Besides, to blend various solvents is preferred in view of controlling the gelation temperature and the drying speed.

The aforementioned cellulose triacetate, the other component(s) becoming solid and the solvents are determined as to the kind, concentration and the like within the aforementioned ranges so that the preparation of the dope is easy and the gelation proceeds faster at a prescribed temperature lower than 10° C.

Figure 4:
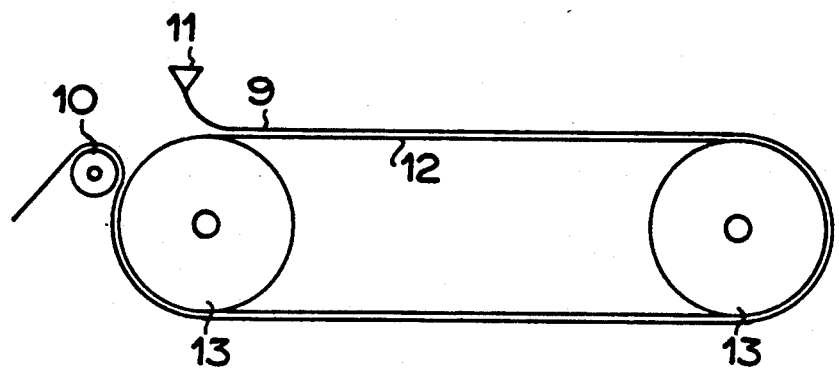
FIG. 4 is a schematic illustation of another apparatus for film casting.

The flow casting process and the stripping process may be conducted according to conventional procedures, like shown in FIG. 3 or FIG. 4. The casting machine may be a drum casting type as shown in FIG. 3 or a band casting type as shown in FIG. 4. In the casting machine of FIG. 4, a dope is fed from the casting die 11 onto the cooling band 12 rotating by the revolving rolls 13, and carried by the band 12. The film 9 is stripped off at the stripping roll 10, and is moved to the drying chamber as shown in FIG. 4. The cooling method in the cooling drum 4 or the cooling band 12 is not limited, and may be conducted by using a cooling medium, cool air, a heat pipe or the like. The cooling temperature is lower than 10° C., preferably lower than 5° C. as the surface temperature of the support.

By arranging the above conditions, the film can be stripped off in a state of having a solvent content of 50 to 80 wt. % of the film.

In the flow casting process of using the cooling drum, the cooling band, or the like, dry air may be not used, or may be used to the extent not to elevate the surface temperature of the support. In the process of the invention, since the film can be stripped from the support even if the film is not dried, the stripped film is liable to lengthen. While, when dry air is used, the film surface is dried prior to stripping to prevent the stripped film from lengthening.

In the process of the invention, the crystallization of cellulose triacetate film in the drying process can be inhibited by drying the film under the condition in the range where the content of volatile components in the film has a prescribed relation with the film surface temperature, and both of the tear strength and the folding endurance can be improved.

On the other hand, the planar orientation of cellulose triacetate film can be loosened by drying the film under the conditions in the range where the content of volatile components in the film has a prescribed relation with the CD shrinkage of the film, and both of the tear strength and the folding endurance can be improved.

EXAMPLES

EXAMPLE 1

Various dopes were prepared having a composition of 17.4 to 21.7 wt. % of cellulose triacetate, 2.6 to 3.3 wt. % of triphenyl phosphate, 63.8 to 68 wt. % of methylene chloride and 11.2 to 12 wt. % of methanol, and cast by the drum casting machine shown in FIG. 3. The solvent content of the film at the stripping roll portion was 70 wt. %. Both sides of the film were fixed by pins, and dried in the drying pattern A, B, C or D shown in FIG. 1 with keeping the interval between both sides constant. The CD shrinkage pattern was conducted in F pattern shown in FIG. 2.

The results are summarized in Table 1.

TABLE 1

| | Drying Pattern | Dope Conc. (wt. %) | Drum Temp. (°C.) | Tear Strength MD (g) | Tear Strength CD (g) | Folding Endurance MD (Times) | Folding Endurance CD (Times) | Judgement |
|---|---|---|---|---|---|---|---|---|
| Example I | D | 25 | 0 | 35 | 35 | 50 | 50 | ◯ |
| Example II | C | 25 | 0 | 37 | 37 | 47 | 47 | ◯ |
| Example III | C | 20 | 0 | 41 | 45 | 48 | 50 | ◯ |
| Example IV | C | 22 | 0 | 36 | 38 | 48 | 48 | ◯ |
| Example V | D | 25 | +5 | 38 | 42 | 51 | 50 | ◯ |
| Example VI | D | 25 | −5 | 37 | 43 | 46 | 48 | ◯ |
| Comparative I | A | 25 | 0 | 80 | 85 | 10 | 5 | X |
| Comparative II | B | 25 | 0 | 67 | 70 | 20 | 20 | X |
| Comparative III | — | 15 | 0 | — | — | — | — | Impossible to Strip |
| Comparative IV | — | 25 | 15 | — | — | — | — | Impossible |

TABLE 1-continued

| | Drying Pattern | Dope Conc. (wt. %) | Drum Temp. (°C.) | Tear Strength MD (g) | Tear Strength CD (g) | Folding Endurance MD (Times) | Folding Endurance CD (Times) | Judgement |
|---|---|---|---|---|---|---|---|---|
| | | | | | | | | to Strip |

MD: Machine direction
CD: Cross direction

The tear strength and the folding endurance were measured in the following methods.

Tear Strength: A slit was formed by a razor, and the resisting force (g) when it was torn in the vertical direction was measured using a light lead tear tester (Toyo Seiki Seisaku-Sho, Ltd.). The torn length was 64 mm. Each film for the test was allowed to stand at 25° C. at 65% RH for more than 3 hours, and then subjected to the test under the same environment.

Folding endurance: Each test film having a size of 150 mm in length×15 mm in width was allowed to stand at 25° C. at 65% RH for more than 3 hours, and the folding endurance was measured using a MIT folding endurance tester (Toyo Seiki Seidaku-Sho, Ltd.) by reating to fold under the same environment until the film was cut. The folding endurance is indicated by the folding number.

A practically suitable film strength measured by the above method is a tear strength of not less than 35 g and a folding endurance of not less than 40 times. As shown in Table 1, the films of Examples I to VI dried according to the pattern C or D in the range of the drying conditions of the invention were excellent in both of the tear strength and the folding endurance. Whereas, in the cases of the films of Comparative Examples I and II dried according to the invention, the folding endurance was very low. In the case of Comparative Example III where the dope concentration, such as the concentration of cellulose acetate, etc., was low, and in the case of Comparative Example IV where the drum temperature was high, the films could not stripped off.

EXAMPLE 2

Various dopes were prepared having a composition of 20.9 wt. % of cellulose triacetate, 3.1 wt. % of triphenyl phosphate, 62.3 to 64.6 wt. % of methylene chloride, 6.84 to 12.9 wt. % of methanol, and 0 to 3.8 wt. % of butanol, and cast by the same drum casting machine as Example 1. The solvent content of the film at the stripping roll portion was 72 wt. %. Both sides of the film were fixed by pins, and dried in the drying pattern E, F, G or H shown in FIG. 2 with keeping the interval between both sides constant. The drying pattern was conducted in D pattern shown in FIG. 1.

The results are summarized in Table 2.

As shown in Table 2, the films of Examples VII to X dried according to the pattern E or F in the range of the CD shrinkage conditions of the invention were excellent in both of the tear strength and the folding endurance. Whereas, in the cases of the films of Comparative Examples V and VI dried according to the pattern G or H out of the range of the invention, the tear strength and the folding endurance were low compared with the above Examples. In the cases of the films of Examples VII to X, forming did not occur, and their flatness was excellent.

The film thickness after drying was 133 μm.

We claim:

1. A process for producing a cellulose triacetate film which comprises a flow casting process comprising feeding a dope having a concentration determined by the amount of cellulose triacetate and other component(s) in a mixed solvent containing methylene chloride, and the wt. % of the solvent(s) other than methylene chloride in the mixed solvent is 13 to 25 wt. % of the total solvent, and solidifying the dope by drying until the solid content remaining after drying is 18 to 35 wt. % of the initial dope, onto a support at which the surface temperature is kept lower than 10° C., and a drying process comprising stripping the cast film from the support and drying the cast film wherein said cast film is under the conditions satisfying the following inequalities:

$60 \leq X, Y \leq 40$ $30 \leq X < 60, Y \leq -4X/3 + 120$ $X < 30, Y \leq -10 X/3 + 180,$ and $X \geq 40, -5 \leq Z \leq -X/2 + 40$ $X \leq 40, -X/4 + 5 \leq Z \leq 20,$ wherein X: the content (%) of volatile components in the film
Y: the surface temperature (°C.) of the film, and
Z: the shrinkage percentage (%) of the film in the cross direction.

* * * * *

TABLE 2

| | Shrinking Pattern in CD | CD Shrinkage | Solvent Composition (wt. %) Methylene-Chloride | Solvent Composition (wt. %) Methanol | Solvent Composition (wt. %) Butanol | Tear Strength MD (g) | Tear Strength CD (g) | Folding Endurance MD (Times) | Folding Endurance CD (Times) | Judgement |
|---|---|---|---|---|---|---|---|---|---|---|
| Example VII | F | 15% | 85 | 15 | 0 | 42 | 45 | 52 | 53 | |
| Example VIII | F | 10 | 85 | 15 | 0 | 38 | 39 | 51 | 52 | |
| Example IX | F | 10 | 82 | 15 | 3 | 37 | 39 | 48 | 49 | |
| Example X | F | 10 | 80 | 17 | 3 | 38 | 40 | 50 | 49 | |
| Example XI | F | 10 | 86 | 9 | 5 | 36 | 38 | 48 | 49 | |
| Comparative VI | G | 0 | 85 | 15 | 0 | 30 | 31 | 33 | 34 | X |
| Comparative VII | H | −5 | 85 | 15 | 0 | 27 | 28 | 32 | 33 | X |